H. F. BERRY.
ROAD PREPARING MECHANISM.
APPLICATION FILED MAR. 11, 1912.

1,073,021.

Patented Sept. 9, 1913.
5 SHEETS—SHEET 1.

Witnesses:

Inventor:
Henry F. Berry
by B. Singer
Atty

H. F. BERRY.
ROAD PREPARING MECHANISM.
APPLICATION FILED MAR. 11, 1912.

1,073,021.

Patented Sept. 9, 1913.

Witnesses:
M. Roche
Everett Lancaster

Inventor
Henry F. Berry
by B. Singer
Atty

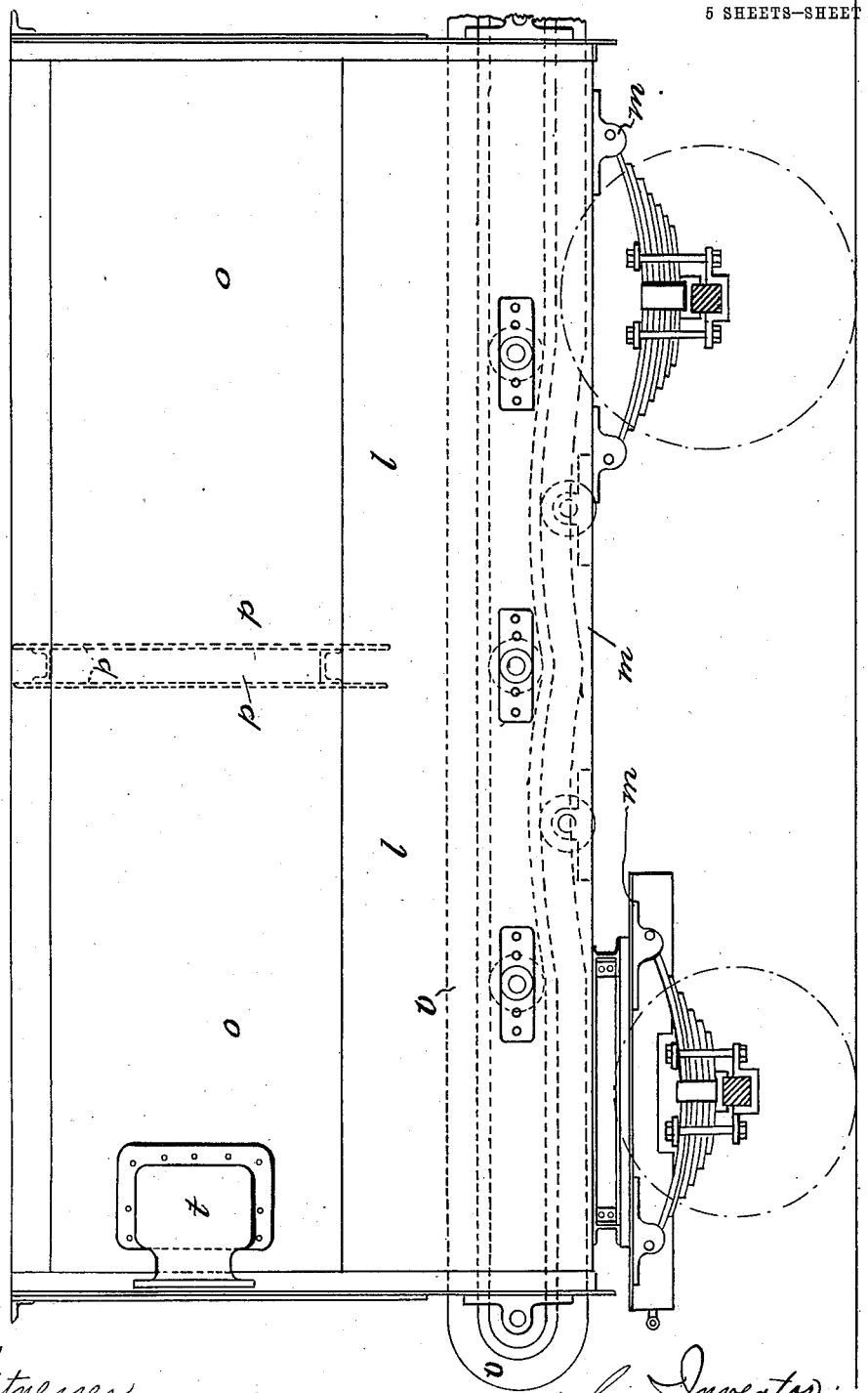

H. F. BERRY.
ROAD PREPARING MECHANISM.
APPLICATION FILED MAR. 11, 1912.
1,073,021.
Patented Sept. 9, 1913.
5 SHEETS—SHEET 4.
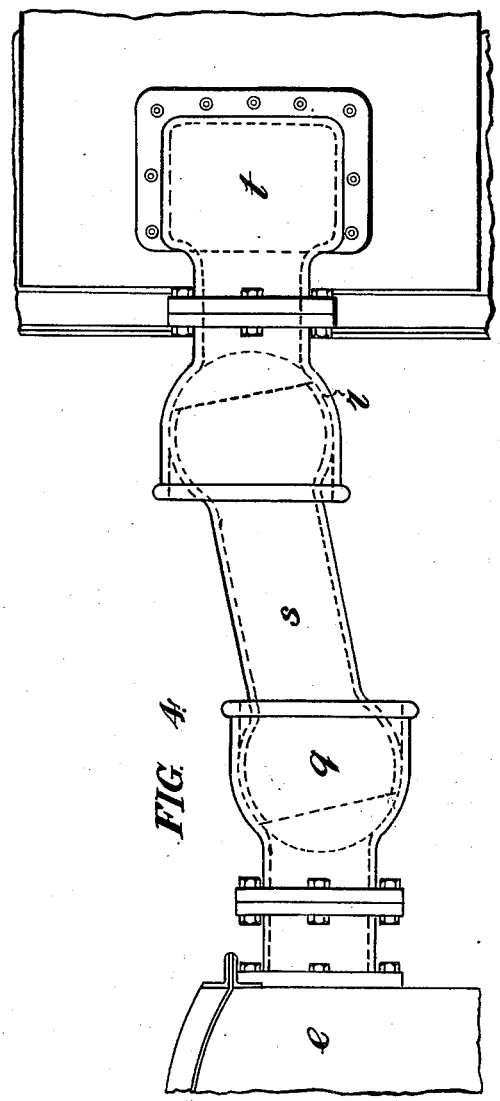

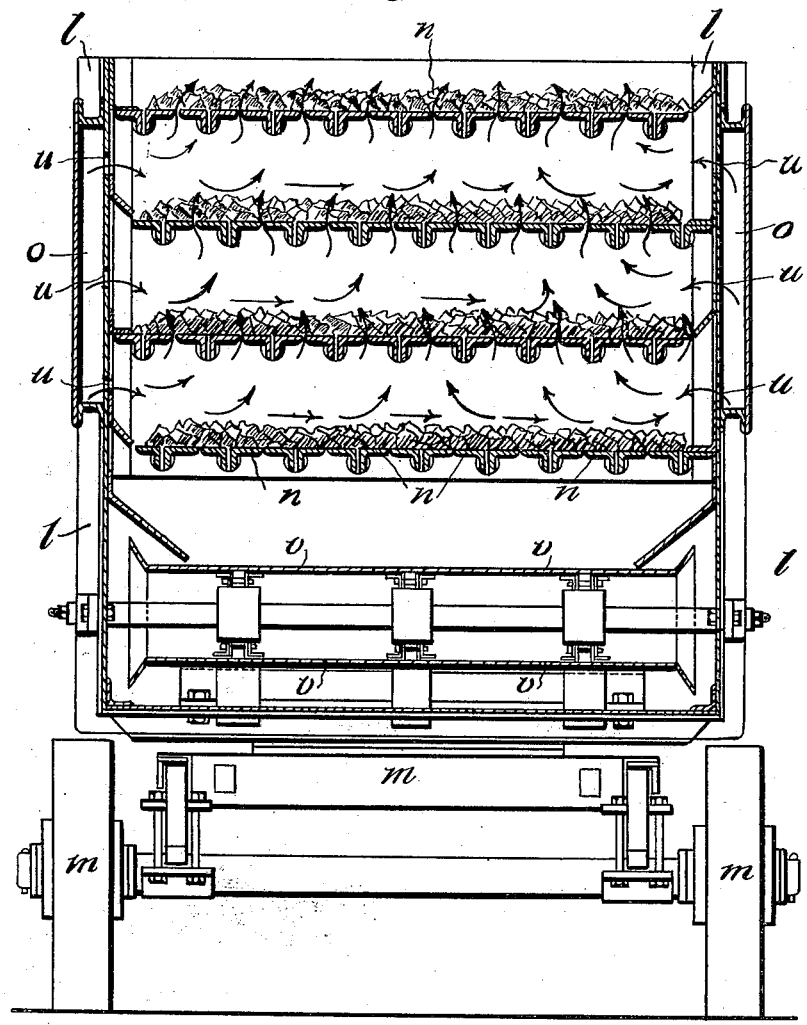

UNITED STATES PATENT OFFICE.

HENRY FRANK BERRY, OF WESTMINSTER, LONDON, ENGLAND.

ROAD-PREPARING MECHANISM.

1,073,021.  Specification of Letters Patent.  Patented Sept. 9, 1913.

Application filed March 11, 1912. Serial No. 683,030.

*To all whom it may concern:*

Be it known that I, HENRY FRANK BERRY, a citizen of Great Britain, residing at 9 Victoria street, Westminster, London, S. W., England, engineer, have invented certain new and useful Improvements in Road-Preparing Mechanism, of which the following is a specification.

This invention comprises improvements relating to the heating and drying of stone and other materials for use on roads and like surfaces and relates to the manufacture of macadam in which tar or similar material is employed as a binding agent.

I have found that to dry stone and like materials sufficiently to enable their being effectually coated with tar and like viscous liquids or compositions it is not sufficient to apply heat alone or to introduce air alone or in conjunction with the heat. Stone in a more or less damp condition appears to be protected against such heat by a film or skin of cold air and moisture which on account of the porosity of the surface is supported by the moisture underlying the surface and is difficult to remove and while in place acts as an insulator. To remove such a protecting film or skin at any rate to efficiently and rapidly dry the material I find it is necessary to have powerful frictional contact of the air with the stone and in my application filed March 11, 1912, Serial Number 683,029, I have set forth and claimed a process of treating the stone for the manufacture of macadam in which bitumen or similar material is used as a binding agent.

My present invention comprises an apparatus which is particularly suitable for treating stone by drying and heating it by means of a rapid current of atmospheric air preparatory to coating it with the desired binding material.

In order that the invention may be thoroughly understood and easily carried into practice I have appended hereunto five sheets of drawings illustrating the invention.

Figure 1:
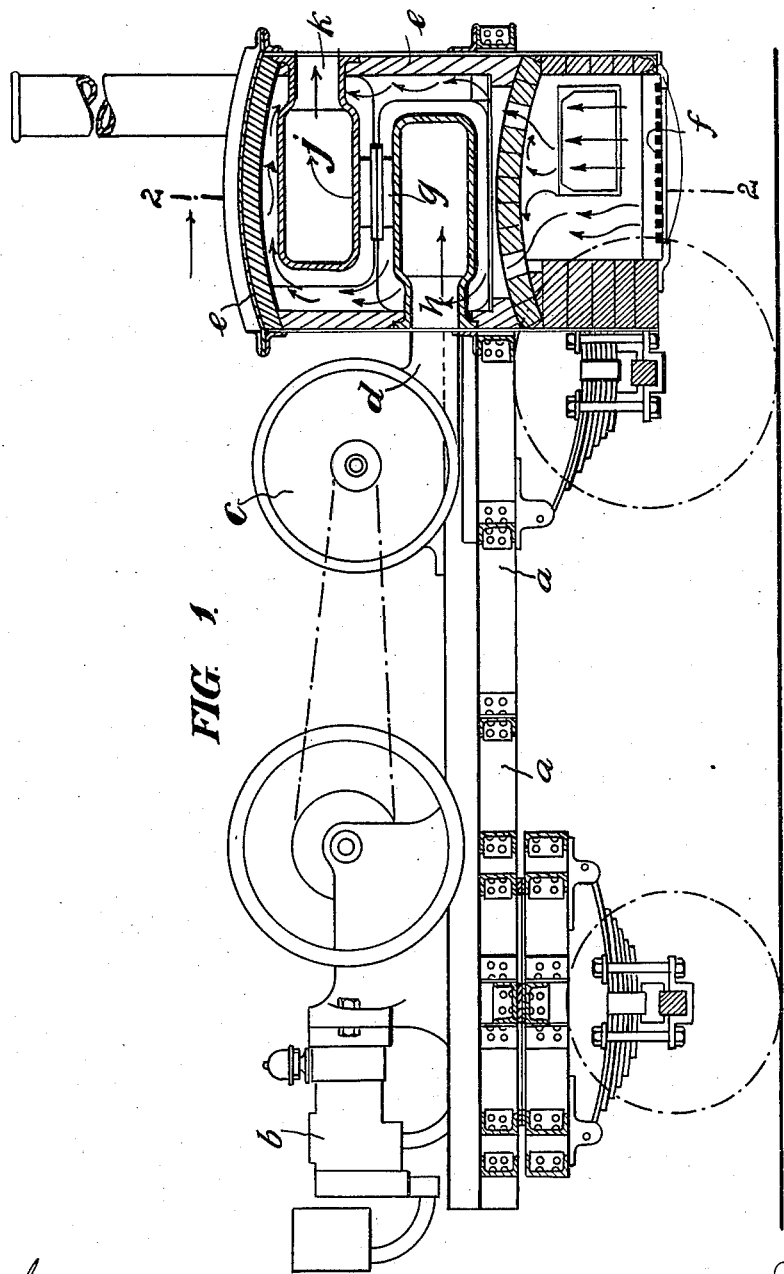
Figure 2:
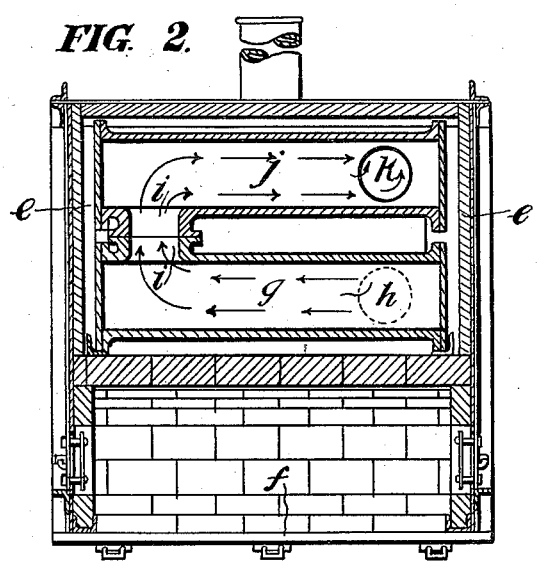
Figure 6:
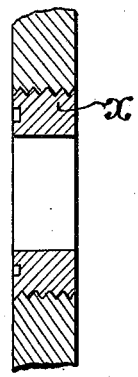

Figure 1 is a sectional elevation of a wheeled frame with an engine and a pressure blower and an air heater mounted thereon. Fig. 2 is a cross section on line 2—2 of Fig. 1. Fig. 3 is an elevation of a wheeled frame on which a container for the material to be dried is mounted. Fig. 4 shows a form of connection from the air heater shown at Fig. 1 to the air chambers of the container shown at Fig. 3. Fig. 5 is a transverse section showing the arrangement of the container where the drying takes place. Fig. 6 is a sectional view showing a modified form of a detail of construction of my invention.

In this apparatus I employ in combination with any suitable container for the stone in which it may be arranged in a manner convenient for treatment, a pump or blower for forcing air and means for driving it so that it is capable of giving a supply of considerable volume of air at a pressure at the blower sufficient to insure the air traveling into the stone with considerable rapidity so that it has a most powerful frictional contact with the surfaces of the stone. I employ a retort or any other suitable means for heating the air prior to its contact with the material; such means preferably being contrived so as not to present obstacles to the passage of the air which would give a considerable resistance to its flow and reduce the velocity below that which is effective for the purpose.

In the apparatus I have illustrated and using a Roots type of blower I have found that a pressure of $\frac{3}{8}$ths of a pound to the square inch at the blower exit gives a satisfactory current of air through the stone and the pressure should not be below $\frac{3}{8}$ths of a pound to the square inch.

In this apparatus $a$ is a suitable running frame or other arrangement giving portability and $b$ represents a suitable engine or motor mounted thereon and $c$ an air pump or blower of any approved pattern capable of giving the desired rapid current of air; the discharge pipe $d$ from the pump or blower $c$ is connected to the shell of the heating apparatus $e$. In the power part of the shell of the heating apparatus is a grate $f$ for a fire or provision for any other suitable form of applying heat. Above the heating provision and connected to the discharge of the blower is a chamber $g$ extending over the heating provision and along for the full length of the grate and this chamber forms a retort. The air is led into the retort at one end $h$ and out at the other, the outlet being preferably arranged at the top as at $i$ to lead to a second similar retort $j$ in which the air has to travel in the reverse direction as the outlet $k$ is at the end remote from the inlet and opposite the inlet $h$ to the first retort. The retorts $h$ and $j$ are preferably of a depth similar to that of the air passage or may be less than that but of greater width so as to spread the air over the heating surfaces without unduly impeding its flow through the apparatus.

When two or more retorts are used the lower one extends the greater part of the way across the apparatus but leaves a space at the side and the hot gases from the grate pass along the underside of this retort and up at the side to the underside of the next; the second one extends from the other side leaving the space at the opposite side of the apparatus so that the gases pass between the top of the one retort and the underside of the other and are then carried round the upper retort to an outlet at the top, see Figs. 1 and 2.

The retorts are substantially built and the air passages into them and from one to the next and out to the connection to the stone drying apparatus are preferably as nearly uniform as possible with the discharge pipe from the blower so that the flow of air is impeded as little as possible and no pressure is wasted in overcoming unnecessary resistance.

The container for the material here shown comprises a large rectangular receptacle $l$ mounted on a suitable running frame $m$. The receptacle is provided with a series of tilting plates $n$ forming successive floors which are preferably capable of being tilted in opposite directions for adjacent floors to insure the constant change of surface of the material as it is dumped from floor to floor. This construction was described in an application for patent filed on the 19th October, 1910, and serially numbered 587982, and the working of the apparatus is as stated in that specification except that instead of being heated by exposure to the hot gases rising from a grate the stone is exposed, in the present apparatus, to the rapid current of hot atmospheric air coming from the heater $e$. For this purpose I provide air chambers $o$ extending along the whole of each side of the container $l$. The chambers $o$ communicate with each other by means of a transverse chamber $p$, Fig. 3, which is preferably centrally arranged.

The air chambers $o$ are connected to the air outlet $k$ from the heater $e$ by means of a flexible connection such as that shown at Fig. 4 comprising two cupped sockets $q$, $r$, connected by a bulbous ended pipe $s$ whose ends are of a shape and size to make a tight working joint in the cupped sockets. As shown the connection is led through an elbow $t$ to one chamber $o$ from which the other chamber $o$ is supplied through the chamber $p$. The air is admitted into the spaces between the various floors by means of holes $u$ in the walls of the chambers $o$ and these holes may be formed smaller on the side where the connection $t$ is arranged to equalize as far as possible the current of air at each side. The holes $u$ may be graduated in size along the machine and at the different floors if desired to enable the distribution to be as even as possible. For this purpose it may be convenient to form holes of a regular size through the walls at each side of the machine and tap those holes with a screw thread so that sleeves $x$ with various bores may be inserted as found desirable to effect an even distribution of the hot air.

Below the bottom floor of plates $n$ I arrange a suitable conveyer $v$, onto which the dried material is dumped and is conducted to one end, preferably the rear of the machine, where it may be delivered into perforated vessels placed in tanks of tar or like viscous liquids or may be suitably conveyed such tanks and be immersed in the tar, etc. which is preferably hot. The conveyer may be driven by any suitable means either by hand or power.

In working this apparatus the material to be dried is thrown onto the upper floor of plates $n$ and the blower or pump driven at the requisite speed to give the rapid current of air which is passed through the retorts $g$ and $j$ and becomes heated to a considerable temperature. The air is blown into the chambers $o$ of the drier or container and discharged between the various floors and onto the stone and through all the interstices of same. The stone or like material is thrown from floor to floor in succession and fresh supplies introduced and the drying rapidly takes place, the stone meanwhile being heated so that when it is on the bottom floor of plates $n$ it has about the temperature suitable for taking up an effective coating of tar or like viscous liquid or compound. It is dumped onto the conveyer and delivered out of the machine and dipped into or passed through the coating material in the desired manner.

I do not claim any particular method of coating the material with tar but although dipping by means of perforated buckets or containers is satisfactory it is better to use mechanical mixers which are well known in analogous arts. For instance an open revolving pan is used in some cases into which the binding material is placed and the stone is dumped into the pan and is kept moving as is also the liquid. In some types of mixers the pan is stationary but mechanical devices are actuated inside the pan to keep the materials in motion.

With a good fire maintained in the air heating retort a high temperature is given to the air in its passage through the retort and moreover the heating can readily be controlled by opening the doors of the furnace or by providing separate controllable openings for this purpose, or by regulating forced draft to the fire. The temperature can be gaged much more readily than on machines where the hot gases from a fire directly heat the stone etc. so that in addition to more rapid and effective drying of the stone the heating of it may be controlled so that it leaves the machine at the temperature which is found best for the binding material that is being used for coating. This is of great importance as it is necessary for securing a proper binding coating that the stone or material shall enter the binding material at a suitable temperature for securing the best adhesion of the coating material on the stone to suit the varying circumstances of the use of the finished macadam. The range of temperature varies from 110° F, which is suitable for some tar compounds, to as high as 400° F, for some asphaltic bitumen compounds.

I have found that the rapidity of the current in its passage through the interstices of the stone etc. is satisfactory in this apparatus if a volume of about 10,000 cubic feet of hot air per hour is put through the machine for every ton of stone etc. to be treated.

Where the word macadam is used in this specification or the claims hereafter it is intended as comprising stone in various grades and sizes or similar materials used for the purpose of forming or constructing or repairing roads and similar surfaces.

What I claim and desire to secure by Letters Patent then is:

1. An apparatus for preparing road making material of the character set forth comprising in combination, a casing having heating means delivering hot gases of combustion thereto, an air retort in and closed with respect to said casing and having an inlet and an outlet, a container for the road making material connected with the outlet of said retort, and means connected with the inlet of said retort for forcing air through said retort into frictional contact with the material in said container, substantially as described.

2. An apparatus for preparing road making material of the character set forth comprising in combination, a vehicle, a casing thereon having heating means delivering hot gases of combustion thereto, a retort in and closed with respect to said casing, and having an inlet and an outlet, a second vehicle, a container for road making material mounted on said second vehicle, a jointed connection connecting the outlet of said retort with the container, and means connected with the inlet of said retort and mounted on said first named vehicle for forcing air under pressure through said retort into frictional contact with the material in said container, substantially as described.

3. An apparatus of the class described comprising in combination, a container for the material and an air chamber having perforations opening to said container, means for supplying air to said chamber under pressure, plugs fitted in said perforations and having openings therethrough.

4. An apparatus for preparing road making material of the class described comprising in combination, a vehicle provided with hot-air supply mechanism, a socket-like discharge for the air from said mechanism, a second vehicle having a container for the material provided with a socket-like intake for the air, and a rigid pipe connection having ball-like ends fitting said socket and forming a communicating connection between said air supply mechanism and said container, substantially as described.

5. An apparatus for use in the manufacture of macadam in which bitumen or similar material is used as a binding agent, comprising a suitable running or supporting frame, an engine on said frame, a pump or blower driven by said engine, an air heating retort arranged on the pressure side of said pump in combination with a container for the stone or like material, said container being provided with floors composed of plates that may be tilted to dump the material from floor to floor, a discharging conveyer, said conveyer being arranged beneath the last tiltable floor.

6. An apparatus for use in the manufacture of macadam in which bitumen or similar material is used as a binding agent, comprising a suitable running or supporting frame, an engine on said frame, a pump or blower driven by said engine, an air heating retort arranged on the pressure side of said pump in combination with a container for the stone or like material, the said air heater comprising one or more chambers such as $g$ or $j$ arranged above a furnace or suitable provision, substantially as set forth and shown.

7. In apparatus for use in the manufacture of macadam in which bitumen or similar material is used, a container for the material to be treated, trays or floors in said container on which the material is disposed, and air chambers in said containers, said chambers having perforations in the wall toward the material.

8. An apparatus for the purpose set forth comprising in combination a suitable power unit, a pump or blower and an air heating retort all arranged on a suitable running frame, a container for the material to be treated on a separate running frame, and a suitable connection from air heater to said container, said connection comprising sockets with shaped ends acting in conjunction with a pipe with ends whose outer contour fits and makes a joint with the inner contour of the sockets, substantially as described.

9. In the manufacture at the site where it is required for use on a road or the like, of macadam in which bitumen or similar material is used as a binding agent, an apparatus for treating the stone and like materials used for such macadam comprising a suitable running or supporting frame or frames with a motor driving a pump or blower which is of suitable size and power to force a large volume of air at considerable rapidity as set forth herein, with an air heater arranged on the pressure side of said pump offering as little resistance as possible to the air passage, and a suitable container for the material, in which the material may be changed about to expose all its surfaces, the container having air distributing means into which the heated air from the retort is forced and is distributed throughout the material.

In testimony whereof, I, the said HENRY FRANK BERRY, have signed my name to this specification in the presence of two subscribing witnesses, this 24th day of February, 1912.

HENRY FRANK BERRY.

Witnesses:
JOHN HINES,
HERBERT D. JAMESON.

Copies of this patent may be obtained for five cents each, by addressing the "Commissioner of Patents Washington, D. C."